(12) United States Patent
Walsh et al.

(10) Patent No.: US 12,409,761 B2
(45) Date of Patent: *Sep. 9, 2025

(54) CHILD RESTRAINT SYSTEM WITH POSTURE FIT MECHANISM

(71) Applicant: Britax Child Safety, Inc., Fort Mill, SC (US)

(72) Inventors: Quentin G. Walsh, Fort Mill, SC (US); Mitchell L. Shellenberger, Mount Joy, PA (US); Brandon Hoover, Cornelius, NC (US); Mark Matthew Messner, Lancaster, PA (US)

(73) Assignee: Britax Child Safety, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,795

(22) Filed: Jun. 5, 2024

(65) Prior Publication Data

US 2024/0317121 A1 Sep. 26, 2024

Related U.S. Application Data

(63) Continuation of application No. 17/587,769, filed on Jan. 28, 2022, now Pat. No. 12,030,411.

(51) Int. Cl.
*B60N 2/26* (2006.01)
*B60N 2/08* (2006.01)
*B60N 2/28* (2006.01)

(52) U.S. Cl.
CPC ......... *B60N 2/2824* (2013.01); *B60N 2/0812* (2013.01); *B60N 2/28* (2013.01); *B60N 2/2851* (2013.01)

(58) Field of Classification Search
CPC ....... B60N 2/28; B60N 2/2851; B60N 2/0812
USPC ................ 297/250.1, 284.1, 284.4, 353, 383
See application file for complete search history.

(56) References Cited

U.S. PATENT DOCUMENTS

| 3,062,583 | A | 11/1962 | Hamilton |
| RE29,841 | E | 11/1978 | Wener |
| 4,339,149 | A | 7/1982 | Nakao et al. |
| 4,348,048 | A | 9/1982 | Thevenot |
| 4,456,302 | A | 6/1984 | Knoedler et al. |

(Continued)

FOREIGN PATENT DOCUMENTS

| CA | 1184482 A | 3/1985 |
| CA | 1286973 C | 7/1991 |

(Continued)

OTHER PUBLICATIONS

IB/373) International Preliminary Report on Patentability Chapter I, PCT/US2023/061535, Sep. 8, 2024.

(Continued)

*Primary Examiner* — Rodney B White
(74) *Attorney, Agent, or Firm* — K&L Gates LLP

(57) ABSTRACT

A child seat comprising: an outer shell supporting an inner shell therein, the inner shell and the outer shell together defining a child protection region within the seat; an adjustment mechanism disposed between the inner shell and the outer shell defining a trajectory of movement for the inner shell relative to the outer shell, wherein relative movement between the inner shell and the outer shell along the trajectory of movement adjusts a size and a shape of the child protection region of the seat.

20 Claims, 10 Drawing Sheets

(56) References Cited

U.S. PATENT DOCUMENTS

| | | |
|---|---|---|
| 4,790,601 A | 12/1988 | Burleigh et al. |
| 4,826,246 A | 5/1989 | Meeker |
| D325,132 S | 4/1992 | Cone |
| 5,494,331 A | 2/1996 | Onishi et al. |
| 5,538,322 A | 7/1996 | Cone et al. |
| 5,593,207 A | 1/1997 | Turner |
| 5,645,317 A | 7/1997 | Onishi et al. |
| 5,685,605 A | 11/1997 | Kassai et al. |
| 5,690,382 A | 11/1997 | Cone |
| 5,788,014 A | 8/1998 | Saint et al. |
| 5,810,432 A | 9/1998 | Haut et al. |
| 5,816,652 A | 10/1998 | Cone et al. |
| 5,829,829 A | 11/1998 | Celestina-Krevh |
| 5,859,509 A | 1/1999 | Bienz et al. |
| 5,961,180 A | 10/1999 | Greger et al. |
| 5,964,502 A | 10/1999 | Stephens |
| 6,030,047 A | 2/2000 | Kain |
| 6,048,028 A | 4/2000 | Bapst |
| 6,079,780 A | 6/2000 | Bapst |
| 6,135,553 A | 10/2000 | Lovie et al. |
| 6,139,100 A | 10/2000 | Baskin-Lockman et al. |
| 6,139,101 A | 10/2000 | Berringer et al. |
| 6,155,638 A | 12/2000 | Bapst |
| 6,170,910 B1 | 1/2001 | Bapst |
| 6,286,844 B1 | 9/2001 | Cone, II et al. |
| 6,318,799 B1 | 11/2001 | Greger et al. |
| 6,322,143 B2 | 11/2001 | Kassai et al. |
| 6,378,950 B1 | 4/2002 | Takamizu et al. |
| 6,428,099 B1 | 8/2002 | Kain |
| 6,431,647 B2 | 8/2002 | Yamazaki |
| 6,474,735 B1 | 11/2002 | Carnahan et al. |
| 6,527,339 B2 | 3/2003 | Voris |
| 6,554,358 B2 | 4/2003 | Kain |
| 6,572,134 B2 | 6/2003 | Barrett et al. |
| 6,594,840 B2 | 7/2003 | Tomas et al. |
| 6,619,753 B2 | 9/2003 | Takayama |
| 6,623,074 B2 | 9/2003 | Asbach |
| 6,637,826 B2 | 10/2003 | Takayama |
| 6,659,564 B2 | 12/2003 | Kassai et al. |
| 6,665,912 B2 | 12/2003 | Turner et al. |
| 6,669,302 B2 | 12/2003 | Warner et al. |
| 6,682,143 B2 | 1/2004 | Amirault et al. |
| 6,695,412 B2 | 2/2004 | Barger et al. |
| 6,705,675 B1 | 3/2004 | Eastman et al. |
| 6,746,080 B2 | 6/2004 | Tsugimatsu et al. |
| 6,817,665 B2 | 11/2004 | Pacella et al. |
| 6,857,700 B2 | 2/2005 | Eastman et al. |
| 7,055,903 B2 | 6/2006 | Balensiefer et al. |
| 7,066,536 B2 | 6/2006 | Williams et al. |
| 7,073,859 B1 | 7/2006 | Wilson |
| 7,104,603 B2 | 9/2006 | Keegan et al. |
| 7,207,628 B2 | 4/2007 | Eros |
| 7,232,185 B2 | 6/2007 | Hartenstine |
| 7,246,855 B2 | 7/2007 | Langmaid |
| 7,278,683 B2 | 10/2007 | Williams et al. |
| 7,322,647 B2 | 1/2008 | Munn et al. |
| 7,325,871 B2 | 2/2008 | Gangadharan et al. |
| 7,370,912 B2 | 5/2008 | Williams et al. |
| 7,387,337 B2 | 6/2008 | Keegan et al. |
| 7,438,358 B2 | 10/2008 | Jane Santamaria |
| 7,458,636 B2 | 12/2008 | Chen et al. |
| 7,625,043 B2 | 12/2009 | Hartenstine et al. |
| 7,673,934 B2 | 3/2010 | Bearup et al. |
| 7,744,156 B2 | 6/2010 | Chen et al. |
| 7,766,367 B2 | 8/2010 | Dotsey et al. |
| 7,828,381 B2 | 11/2010 | Barger |
| 7,862,117 B2 | 1/2011 | Hutchinson et al. |
| 8,070,226 B2 | 12/2011 | Dingler et al. |
| 8,087,725 B2 | 1/2012 | Hutchinson et al. |
| 8,123,295 B2 | 2/2012 | Hutchinson et al. |
| 8,136,880 B2 | 3/2012 | Biaud et al. |
| 8,152,647 B2 | 4/2012 | Tuckey et al. |
| 8,205,943 B2 | 6/2012 | Zhong |
| 8,282,165 B2 | 10/2012 | Kespohl |
| 8,313,142 B2 | 11/2012 | Xiao |
| 8,393,678 B2 | 3/2013 | Keegan et al. |
| 8,408,656 B2 | 4/2013 | Carpenter |
| 8,474,907 B2 | 7/2013 | Weber et al. |
| 8,544,952 B2 | 10/2013 | Keegan et al. |
| 8,550,567 B2 | 10/2013 | Biaud |
| 8,567,862 B2 | 10/2013 | Williams et al. |
| 8,567,867 B2 | 10/2013 | Arnold, IV |
| 8,573,693 B2 | 11/2013 | Gaudreau, Jr. |
| 8,579,369 B2 | 11/2013 | Gaudreau, Jr. et al. |
| 8,585,138 B2 | 11/2013 | Gaudreau, Jr. |
| 8,585,143 B2 | 11/2013 | Gaudreau, Jr. |
| 8,596,718 B2 | 12/2013 | Gaudreau, Jr. |
| 8,622,478 B2 | 1/2014 | Spence |
| 8,632,127 B2 | 1/2014 | Brunick et al. |
| 8,746,794 B2 | 6/2014 | Oren et al. |
| 8,764,108 B2 | 7/2014 | Gaudreau, Jr. |
| 8,801,096 B2 | 8/2014 | Brunick et al. |
| 8,870,285 B2 | 10/2014 | William et al. |
| 8,899,678 B2 | 12/2014 | Doolan et al. |
| 8,905,476 B2 | 12/2014 | Davis |
| 8,926,014 B2 | 1/2015 | Su |
| 8,973,884 B1 | 3/2015 | Stuckey et al. |
| 8,979,198 B2 | 3/2015 | Williams et al. |
| 8,991,929 B2 | 3/2015 | Doucette et al. |
| 8,998,312 B2 | 4/2015 | Sellers et al. |
| 8,998,317 B2 | 4/2015 | Guo |
| 9,016,782 B2 | 4/2015 | Xu |
| 9,022,472 B2 | 5/2015 | Chen |
| 9,114,739 B2 | 8/2015 | Conway |
| 9,156,379 B2 | 10/2015 | Williams et al. |
| 9,187,014 B2 | 11/2015 | Finnestad |
| 9,211,817 B2 | 12/2015 | Leese |
| 9,346,377 B2 | 5/2016 | Xu |
| 9,381,834 B2 | 7/2016 | Hutchinson |
| 9,440,562 B2 | 9/2016 | Heisey et al. |
| 9,592,751 B2 | 3/2017 | Kirstein |
| 9,603,463 B2 | 3/2017 | Varney et al. |
| 9,604,554 B2 | 3/2017 | Renaudin et al. |
| 9,656,576 B2 | 5/2017 | Renaudin et al. |
| 9,789,791 B2 | 10/2017 | Hutchinson |
| 9,873,359 B2 | 1/2018 | Williams et al. |
| 9,950,649 B2 | 4/2018 | Pleiman et al. |
| 9,975,457 B2 | 5/2018 | Chen |
| 10,245,981 B2 | 4/2019 | Mitchell |
| 10,252,646 B2 | 4/2019 | Hutchinson |
| 10,266,078 B2 | 4/2019 | Mason et al. |
| 10,272,804 B2 | 4/2019 | Williams |
| 10,299,609 B2 | 5/2019 | Taylor |
| 10,315,538 B2 | 6/2019 | Hutchinson |
| 10,479,236 B2 | 11/2019 | Mason |
| 10,507,743 B2 | 12/2019 | Oswald |
| 10,562,419 B2 | 2/2020 | Genoway |
| 10,625,637 B2 | 4/2020 | Cui |
| 10,632,871 B2 | 4/2020 | Schmitz et al. |
| 10,640,020 B2 | 5/2020 | Jung et al. |
| 10,696,192 B2 | 6/2020 | Harmes, V |
| 10,730,414 B2 | 8/2020 | Pleiman |
| 10,807,506 B2 | 10/2020 | Denbo et al. |
| 10,843,597 B2 | 11/2020 | Lehman et al. |
| 10,843,605 B2 | 11/2020 | Johnson et al. |
| 10,875,426 B2 | 12/2020 | Johnson et al. |
| 10,906,434 B2 | 2/2021 | Duan |
| 10,940,778 B2 | 3/2021 | Fu |
| 10,988,056 B2 | 4/2021 | Oswald et al. |
| 12,030,411 B2 * | 7/2024 | Walsh .............. B60N 2/0812 |
| 2001/0013689 A1 | 8/2001 | Cone |
| 2003/0102702 A1 | 6/2003 | Daley |
| 2004/0070244 A1 | 4/2004 | Williams et al. |
| 2004/0259647 A1 | 12/2004 | Wood et al. |
| 2005/0082888 A1 | 4/2005 | Williams et al. |
| 2006/0261651 A1 | 11/2006 | Nolan et al. |
| 2007/0069567 A1 | 3/2007 | Chen |
| 2009/0127827 A1 | 5/2009 | Pike et al. |
| 2011/0148155 A1 | 6/2011 | Chapman et al. |
| 2012/0223558 A1 | 9/2012 | Wang |
| 2012/0292880 A1 | 11/2012 | Bapst |
| 2012/0292963 A1 | 11/2012 | Sedlack |
| 2013/0214574 A1 | 8/2013 | Chapman et al. |
| 2014/0259338 A1 | 9/2014 | Welch et al. |

(56) References Cited

U.S. PATENT DOCUMENTS

| | | |
|---|---|---|
| 2016/0059746 A1 | 3/2016 | Finnestad et al. |
| 2016/0114705 A1 | 4/2016 | Morgenstern et al. |
| 2016/0207497 A1 | 7/2016 | Seal et al. |
| 2016/0304004 A1 | 10/2016 | Sandbothe et al. |
| 2020/0214468 A1 | 7/2020 | Fischer et al. |
| 2020/0223331 A1 | 7/2020 | Mason et al. |
| 2020/0223333 A1 | 7/2020 | Mason et al. |
| 2020/0239053 A1 | 7/2020 | Holleis |
| 2021/0016691 A1 | 1/2021 | Newbright |
| 2021/0039526 A1 | 2/2021 | Lehman et al. |
| 2021/0094447 A1 | 4/2021 | Zhao |
| 2021/0107384 A1 | 4/2021 | Duan |
| 2021/0237626 A1 | 8/2021 | Longenecker et al. |

FOREIGN PATENT DOCUMENTS

| | | |
|---|---|---|
| CA | 2127003 A1 | 1/1995 |
| CA | 2126123 C | 1/1999 |
| CA | 2133349 C | 4/1999 |
| CA | 2279672 A1 | 4/2000 |
| CA | 2280111 A1 | 4/2000 |
| CA | 2076954 C | 10/2000 |
| CA | 2199326 C | 8/2001 |
| CA | 2276437 C | 8/2001 |
| CA | 2326282 A1 | 11/2001 |
| CA | 2358762 A1 | 4/2002 |
| CA | 2358814 A1 | 4/2002 |
| CA | 2327440 A1 | 6/2002 |
| CA | 2381198 A1 | 11/2002 |
| CA | 2418541 A1 | 8/2003 |
| CA | 2421706 A1 | 10/2003 |
| CA | 2425659 A1 | 10/2003 |
| CA | 2186703 C | 12/2003 |
| CA | 2281424 C | 1/2004 |
| CA | 2323855 C | 9/2005 |
| CA | 2525024 A1 | 12/2006 |
| CA | 2368338 C | 11/2007 |
| CA | 2427170 C | 1/2008 |
| CA | 2353166 C | 12/2008 |
| CA | 2459843 C | 1/2009 |
| CA | 2633247 C | 5/2011 |
| CA | 2635892 C | 8/2011 |
| CA | 2760517 C | 12/2012 |
| CA | 2760710 C | 10/2013 |
| CA | 2763992 C | 5/2014 |
| CA | 2763903 C | 8/2014 |
| CA | 2773802 C | 6/2015 |
| CA | 2881133 C | 6/2017 |
| CA | 2987972 C | 9/2019 |
| CA | 3025551 C | 3/2020 |
| CA | 3061634 A1 | 5/2020 |
| CA | 3009277 C | 6/2020 |
| CA | 3020679 C | 8/2020 |
| CA | 3094675 A1 | 3/2021 |
| EP | 1110807 A1 | 6/2001 |
| EP | 1084900 A3 | 1/2003 |
| EP | 1435308 A1 | 7/2004 |
| EP | 1279554 B1 | 9/2004 |
| EP | 1516775 B1 | 4/2008 |
| EP | 1591307 A3 | 10/2009 |
| EP | 1621395 B1 | 9/2010 |
| EP | 2272709 A2 | 1/2011 |
| EP | 2008550 B1 | 3/2011 |
| EP | 2219932 B1 | 6/2011 |
| EP | 1986526 A4 | 11/2011 |
| EP | 2474440 A2 | 7/2012 |
| EP | 2375941 B1 | 9/2014 |
| EP | 2903856 A1 | 8/2015 |
| EP | 2763870 B1 | 12/2015 |
| EP | 2407341 B1 | 5/2016 |
| EP | 2295286 B1 | 7/2016 |
| EP | 2391524 B1 | 1/2017 |
| EP | 3292019 A1 | 3/2018 |
| EP | 1759916 B1 | 4/2018 |
| EP | 2865562 B1 | 9/2018 |
| EP | 2258583 B8 | 10/2018 |
| EP | 3421291 A1 | 1/2019 |
| EP | 3326859 B1 | 9/2019 |
| EP | 3768552 A1 | 1/2021 |
| EP | 3770011 A1 | 1/2021 |
| WO | WO2021051057 A1 | 3/2021 |
| WO | WO2021052928 A1 | 3/2021 |

OTHER PUBLICATIONS

ISA/210) International Search Report; PCT/US2023/061535; Apr. 8, 2023.

ISA/237) Written Opinion of the International Searching Authority; PCT/US2023/061535; Apr. 8, 2023.

\* cited by examiner

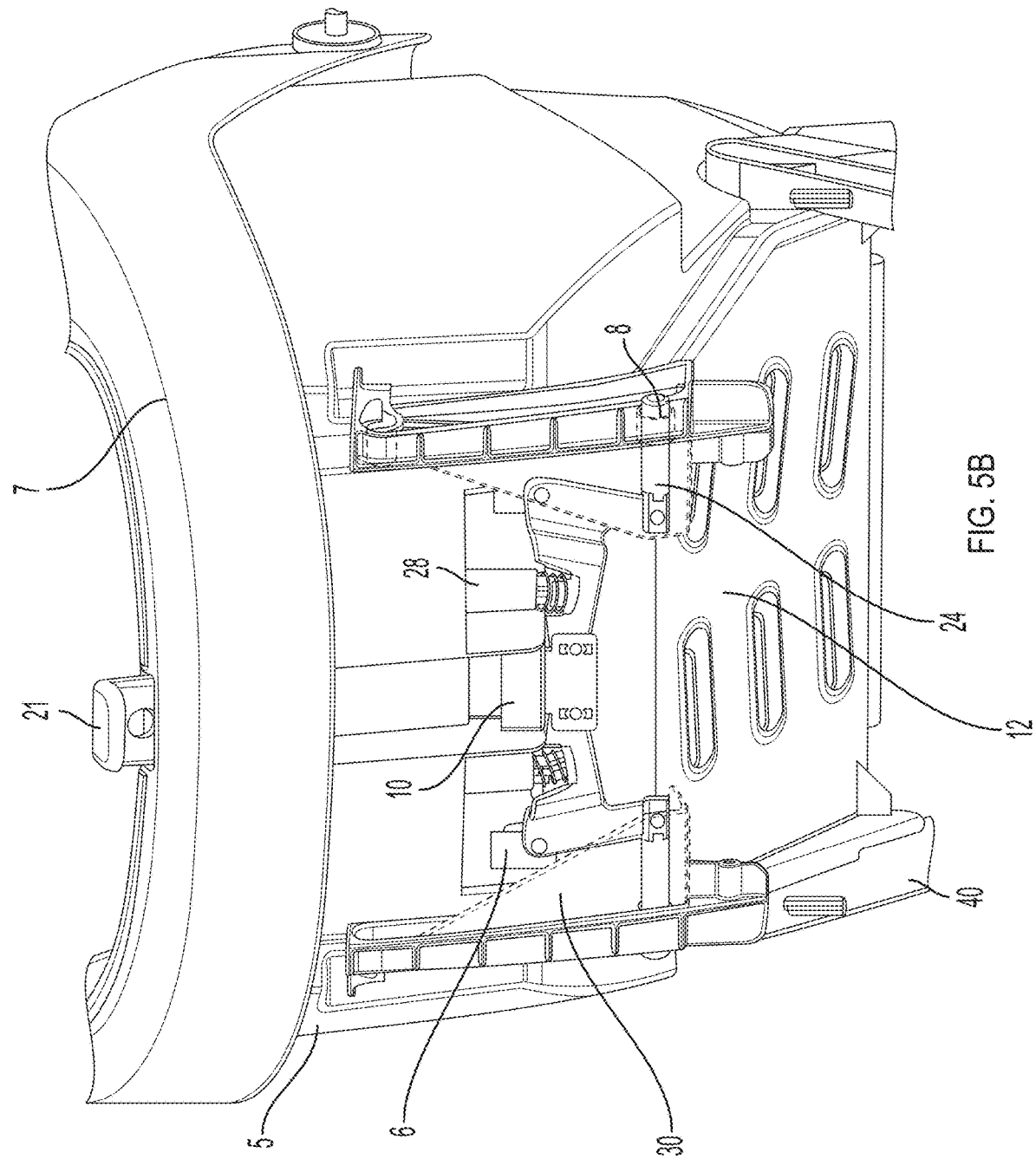

CHILD RESTRAINT SYSTEM WITH POSTURE FIT MECHANISM

CROSS-REFERENCE TO RELATED APPLICATIONS

The present application is a continuation of U.S. patent application Ser. No. 17/587,769, entitled CHILD RESTRAINT SYSTEM WITH POSTURE FIT MECHANISM and filed Jan. 28, 2022, now U.S. Pat. No. 12,030,411 B2, the contents of which are hereby incorporated by reference in their entirety.

TECHNICAL FIELD

This application relates to child restraint systems, and more particularly, to child restraint systems with a mechanism for adjusting to the posture and size of a child.

BACKGROUND

Child restraint systems, also commonly called child safety seats, child seats, car seats, or booster seats, among others, are designed to protect children in vehicles from the effects of impacts or sudden changes in motion (e.g., sudden acceleration, sudden deceleration, etc.). Child restraint systems, referred to hereinafter as child seats, can be used in a variety of vehicles with different seat types and/or seating configurations.

While it is important for a child seat to be properly secured to a vehicle (e.g., car seat or underlying structure) to protect the child, it is also important that the child seat be properly sized and configured to support the child correctly and provide maximum protection in the event of an impact. As a child grows their proportions change rapidly in the early years of life and any selected seat configuration will be quickly outgrown as the child develops. For example, in early infancy a child's bones are supple and capable of more flexure than those of an adult; however, their head and neck are particularly vulnerable to impact or sudden directional changes in momentum as the head is large and the supporting musculature of the neck is still developing. In such situations an improper amount, or location, of head and neck support can result in reduced protection in the event of an impact.

The following invention was conceived with these shortcomings in mind.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to a first aspect, the invention is directed to a child seat including: an outer shell supporting an inner shell therein, the inner shell and the outer shell together defining a child protection region within the seat; an adjustment mechanism disposed between the inner shell and the outer shell defining a trajectory of movement for the inner shell relative to the outer shell, wherein relative movement between the inner shell and the outer shell along the trajectory of movement adjusts a size and a shape of the child protection region of the seat.

The adjustment mechanism may include a latch having a pair of opposing latching pins mounted to the inner shell via a release lever, each latching pin constrained to travel within a pair of opposing arcuate extension tracks of the outer shell in a first unlocked configuration. Each of the pair of arcuate extension tracks may include a peripheral wall defining the trajectory of movement between the inner shell and the outer shell and a plurality of corresponding locking apertures for receiving and retaining the latching pins in a second locked configuration. The inner shell may provide a pair of upper mounting projections for engaging with the arcuate extension tracks. The latching pins of the adjustment mechanism may be packaged within the upper mounting projections such that the latching pins protrude through the upper mounting projections when engaging with the arcuate extension tracks. The upper mounting projections may be cylindrical in form to: (i) allow the latching pins to translate therethrough; and (ii) to allow the upper mounting projections to slide along the arcuate extension tracks.

The plurality of corresponding locking apertures may be aligned between the pair of arcuate extension tracks to define a series of predetermined configurations of the child protection region of the seat. The opposing ends of the peripheral walls of each arcuate extension track may define a first stop and a second stop, the trajectory of movement of the latching pins confined therebetween.

A first latching pin may be movably mounted to the release lever via a first rotatable armature and a second latch pin is movably mounted to the release lever via a second rotatable armature, such that translation of the release lever in a first direction rotates the first and second rotatable armatures towards one another thereby retracting the first latch pin and the second latch pin from respective locking apertures of the arcuate extension tracks to allow the inner shell to move freely along the arcuate tracks. The first direction of the release lever may be directed away from the outer shell.

In some embodiments, each rotatable armature may be an L-shape defining three mounting points in a common plane: a first mounting point rotatably mounting the armature to the inner shell; a second mounting point rotatably mounting the armature to the release lever; and a third mounting point pivotally mounting the latching pin to the armature. Each rotatable armature may include a spring seat located between the first and second mounting points for trapping a return spring between the spring seat and the inner shell. Translation of the release lever in the first direction may compress each return springs against the respective spring seat, thereby biasing the latching pins toward the locked configuration.

In some embodiments, each latching pin may be pivotally mounted to the respective rotatable armature to facilitate retraction of each latching pin from the locking aperture at right angles (perpendicular to) to the first direction. The release lever may include a release handle at an upper end thereof to facilitate operation of the adjustment mechanism. A lower end of the release lever may include a pair of spindles for rotatably mounting the first and second armatures thereto. The release handle may be mounted within a collar of the inner shell. The release handle may be accessible from the outer shell.

In some embodiments, the arcuate extension tracks may be integrally formed within the outer shell. In some embodiments, the arcuate extension tracks may be formed within a pair of upper mounts, detachably affixed to the outer shell. The release lever may be elongate and planar, to be locatable between the inner shell and the outer shell.

In some embodiments, the outer shell may include a pair of guide members spaced apart from the arcuate extension tracks and configured to respectively receive a pair of outwardly facing projections from the inner shell. The guide members may define an arcuate guide track defining a second trajectory of movement between the inner shell and the outer shell. A length and a curvature of the arcuate guide track may conform to a length and a curvature of the arcuate extension track, such that a first portion of the inner shell travels through the same trajectory of movement as a second portion of the inner shell, relative to the outer shell. In some embodiments, at least one of a length and a curvature of the arcuate guide track may differ to a length and a curvature of the arcuate extension track, such that a first portion of the inner shell travels through a first trajectory of movement and a second portion of the inner shell travels through a second trajectory of movement, relative to the outer shell. The arcuate guide tracks may be integrally formed within the outer shell. In some embodiments, the arcuate guide tracks may be formed within a pair of lower mounts, detachably mounted to the outer shell. The inner shell may provide a support shoulder configured to abut the guide members, supporting the inner shell against the outer shell.

In some embodiments, the inner shell may provide a plurality of restraint apertures for receiving and securing a seat belt therethrough, such that the restrain apertures move with the inner shell relative to the outer shell. The inner shell may be configured to receive and retain a plurality of interchangeable support cushions to further vary the size and a shape of the safety region of the seat.

In some embodiments, the size and the shape of the child protection region in the compact configuration is arranged to support a child in a supine orientation.

In some embodiments, the size and the shape of the child protection region in the extended configuration is arranged to support a child in an upright seating orientation.

In some embodiments, the inner shell includes a posture support surface for supporting a spine of a child, wherein the movement of the inner shell from the compact configuration toward the extended configuration adjusts a distance and an angular orientation of the posture support surface relative to the outer shell thereby shaping the child protection region to encourage the child to adopt an upright seating orientation.

In some embodiments, the inner shell includes a posture support surface for supporting a spine of a child, wherein the movement of the inner shell from the extended configuration toward the compact configuration adjusts a distance and an angular orientation of the posture support surface relative to the outer shell thereby shaping the child protection region to encourage the child to adopt a supine orientation.

In a second aspect, the invention provides a method of adjusting the child protection region of a child safety seat formed between an outer shell and a moveable inner shell, the method including the steps of: (a) actuating a release lever to unlock a biased adjustment mechanism including a pair of latching pins releasing the seat from a compact configuration; (b) sliding the inner shell along a pair of arcuate extension tracks to reposition the inner shell relative to the outer shell; (c) aligning the latching pins with a pair of respective locking apertures of the arcuate extension tracks; and (d) releasing the release lever to urge the latching pins of the adjustment mechanism into the respective locking apertures of the arcuate extension tracks, locking the inner shell against the outer shell in an extended configuration.

The method may further include the step of attaching inserts to the inner shell to further define the shape and size of the child protection region. The inserts may be selected from a plurality of cushions having differing sizes and shapes thereby adjusting the shape and size of the child protection region.

In a third aspect, the invention provides a child seat including an outer shell supporting an inner shell therein, the inner shell and the outer shell together defining a child protection region within the seat and an adjustment mechanism disposed between the inner shell and the outer shell defining a trajectory of movement for the inner shell relative to the outer shell, wherein the inner shell includes a posture support surface for supporting a spine of a child and wherein movement of the inner shell relative to the outer shell along the trajectory of movement adjusts a size and a shape of the child protection region of the seat to transition the seat between a compact configuration and an extended configuration by adjusting a distance and an angular orientation of the posture support surface relative to the outer shell thereby shaping the child protection region to encourage the child to adopt a supine orientation.

In some embodiments, the child seat further includes at least one insert attached to the inner shell, the at least one insert defining a shape of a child protection region. The at least one insert can be selected from a plurality of cushions having differing sizes and shapes.

In some embodiments, the adjustment mechanism includes a latch having a pair of opposing latching pins mounted to the inner shell via a release lever, each latching pin constrained to travel within a respective extension track of a pair of opposing extension tracks of the outer shell in a first unlocked configuration.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

Exemplary embodiments of the invention are described below by way of example only, and not by way of limitation. The specification makes reference to the following appended figures, in which use of like reference numerals in different figures is intended to illustrate like or analogous components.

FIG. 5B is a perspective view of the adjustment mechanism of FIG. 5A in an unlocked configuration.

Figure 1:
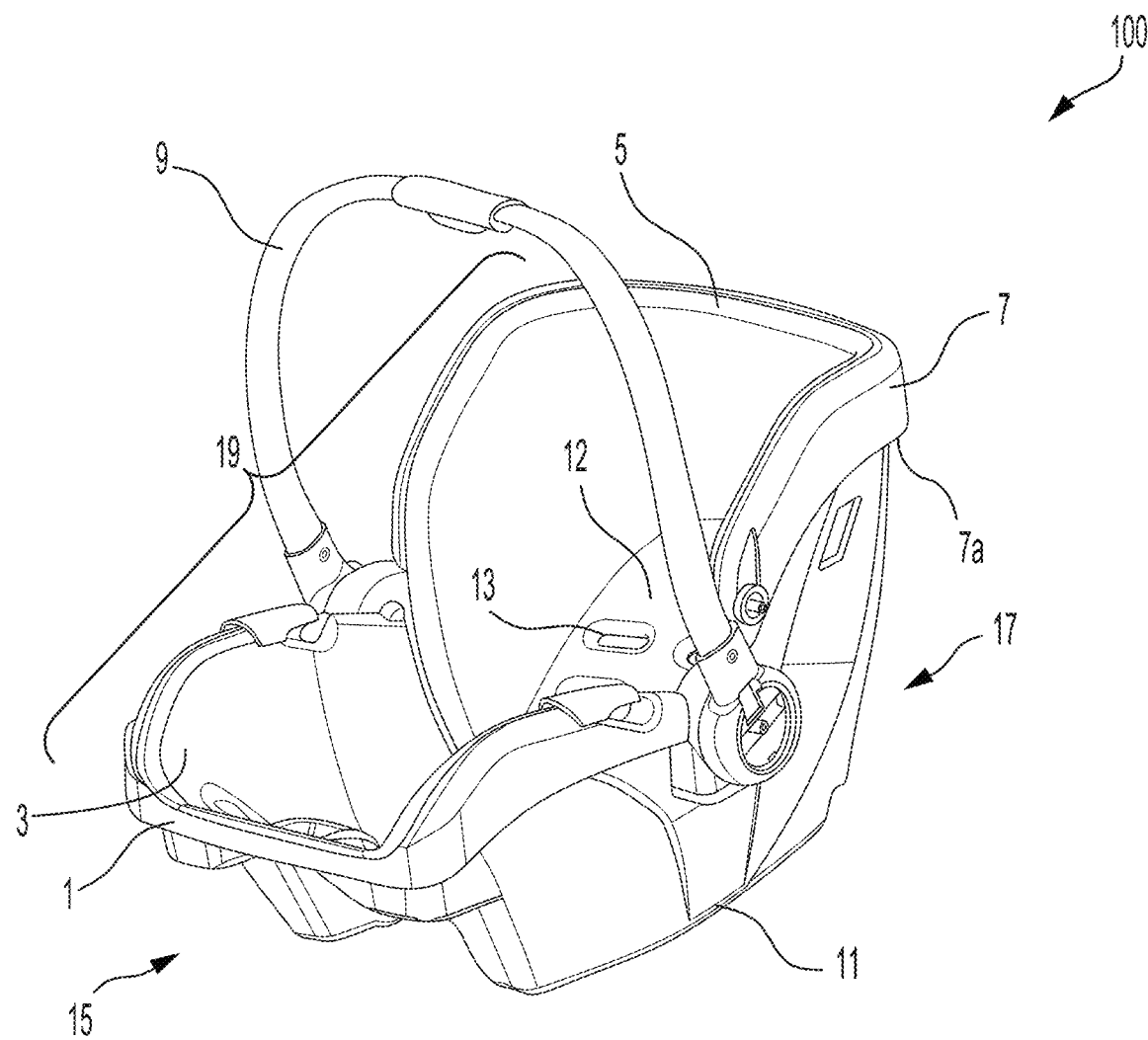
FIG. 1 is a perspective view of a child seat in a compact configuration according to one embodiment of the invention, illustrating an outer shell and an inner shell to the seat.

Embodiments will now be described more fully hereinafter with reference to the accompanying drawings, in which various embodiments, although not the only possible embodiments, of the invention are shown. The invention may be embodied in many different forms and should not be construed as being limited to the embodiments described below.

DETAILED DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". In the figures and the description, like numerals are intended to represent like elements.

A child seat is configured for installation based on the height and weight of a child and according to various guidelines and standards, such as those of the United States National Highway Transportation Safety Administration. To ensure maximum protection for an occupant of the child seat, the child seat may be secured to a fixed location in a vehicle, such as using a seat belt of the car seat or LATCH (Lower Anchors and Tethers for Children) attachments. When seat belts are used to secure the child seats, the seat belts are typically positioned around the child seat and then engaged with a buckle attached to the car seat. However, securing the seat to the vehicle provides only part of the required protection. Ensuring the child seat is the correct shape and size ("fit") for the child then completes the protection required to cushion and support the child both for everyday comfort and for an impact event.

With this in mind, described herein is an adjustment mechanism for a child seat that provides means for better conforming the seat and internal cushioning around the child. In certain embodiments, the adjustment mechanism described herein allows a user to vary a position of an inner shell relative to a fixed outer shell and to thereby alter the shape and size of the child protection region defined by the child seat. Various other advantages and benefits may be realized with the adjustment mechanism described herein, and the aforementioned benefits and advantages should not be considered limiting.

FIGS. 1-8 illustrate an example of a child seat 100 according to various embodiments, the child seat 100 including: an outer shell 1 supporting an inner shell 5 therein, the inner shell 5 and the outer shell 1 together defining a child protection region 19 within the seat 100. An adjustment mechanism 20 is disposed between the inner shell 5 and the outer shell 1, defining a trajectory of movement for the inner shell 5 relative to the outer shell 1. The relative movement between the inner shell 5 and the outer shell 1 along the trajectory of movement adjusts a size and a shape of the child protection region 19 of the seat 100.

Figure 8:
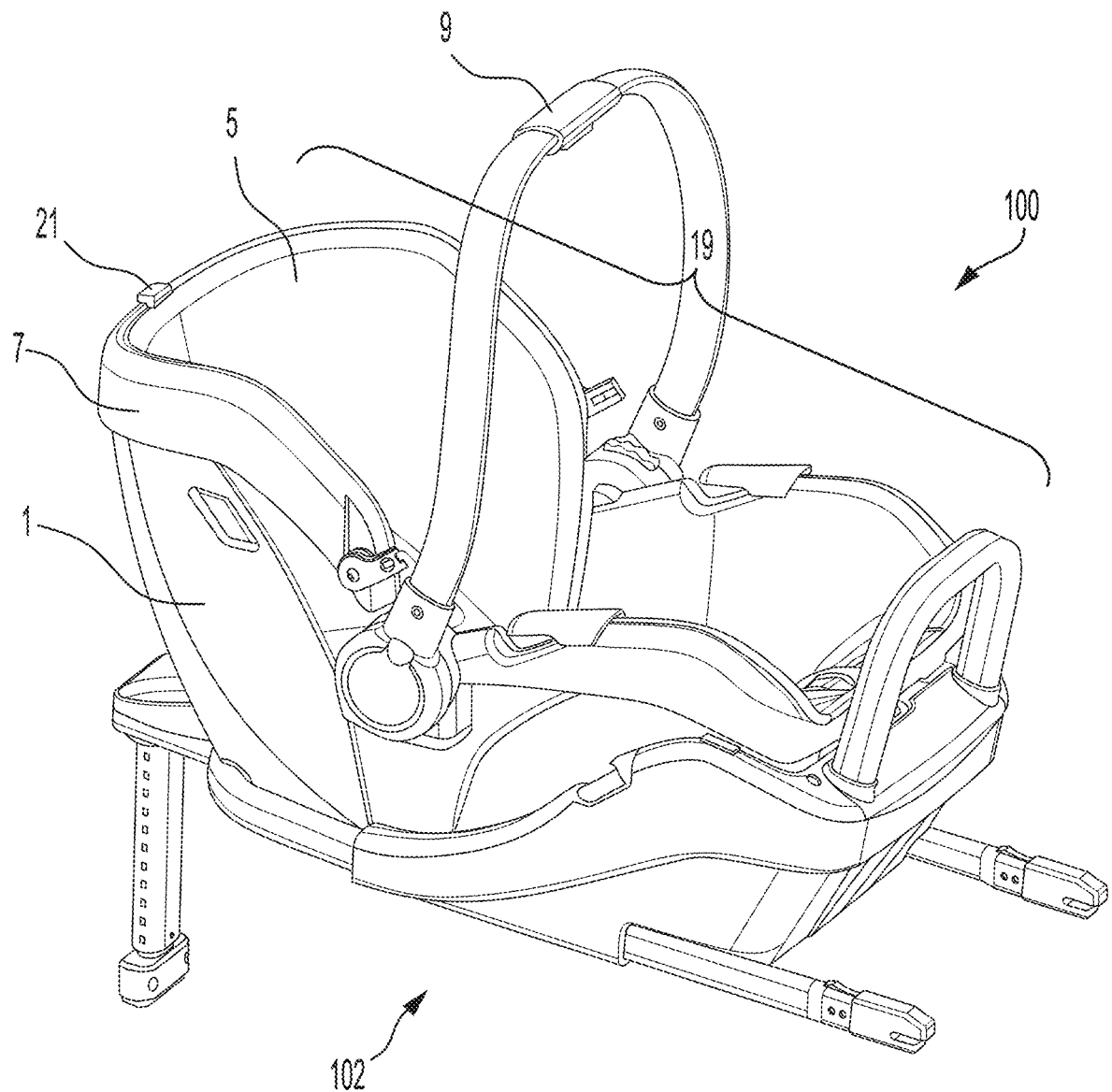
FIG. 8 is a perspective view of the child seat of FIG. 1 mounted to a base unit.

As illustrated in FIG. 1, for example, the child seat 100 includes the outer shell 1 having a base 11 configured for cooperative mounting with a base unit 102 (such as illustrated in FIG. 8). The inner shell 5 provides a posture support surface 12 having a plurality of restraint apertures 13 for cooperating with a harness restraint, securing the child within the seat 100. The restraint apertures 13, as part of the inner shell 5, move relative to the outer shell 1 as the child protection region 19 is adjusted. Furthermore, as the inner shell 5 is moved towards the extended configuration, both the location of the posture support surface 12 and an angular orientation of the posture support surface 12 is adjusted in relation to the outer shell 1. Specifically, the posture support surface 12 is drawn away from the base 11 of the seat 100 and an angle between the posture support surface 12 and the base 11 is reduced, bringing the posture support surface 12 into a more upright orientation to support the spine and posture of a child in a seated orientation. As illustrated in FIG. 1, the child seat 100 is an infant car seat; however, in many embodiments, the adjustment mechanism 20 can be provided with other types of child seats as desired, including but not limited to convertible cart seats (i.e., can be forward-facing or rear-facing), a 3-in-1 car seat, booster seats, and/or other types of child seats as desired.

The outer shell 1 houses the inner shell 5 and a fixed liner 3. The fixed liner 3 includes a cover that protects the release mechanism from being effected by soft goods or an occupant of the seat 100. The fixed liner 3 conforms to an inner shape of the outer shell 1. The inner shell 5 is movable relative to the outer shell 1 and together they define the child protection region 19 of the seat 100. In the infant car seat 100, a child's limbs and head are contained within the child protection region 19 of the seat 100 proving protection thereto.

The child protection region 19 can be fitted with cushions and/or various padded components to provide additional support, protection and comfort to the child when retrained in the seat 100. The additional support and/or cushions can be removably attached to the inner shell 5 and/or fixed liner 3 at designated locations by means of fasteners to stop the supports and/or cushions from being accidentally displaced by the child or the user when fitting the seat 100 to a vehicle. Suitable fasteners can be selected from (but are not limited to) buttons, snap fit projections, Velcro, ties, magnets, and straps.

The seat 100 further includes a handle 9 for lifting the seat 100 into and out of the base unit 102 and for carrying the seat independently of the base unit 102. The handle 9 is adjustably mounted to the seat 100 and can be lifted (as shown in FIG. 1) into an active configuration, or laid flat over a front 16 or rear 17 of the seat, in a stowed configuration (not shown).

Figure 2:
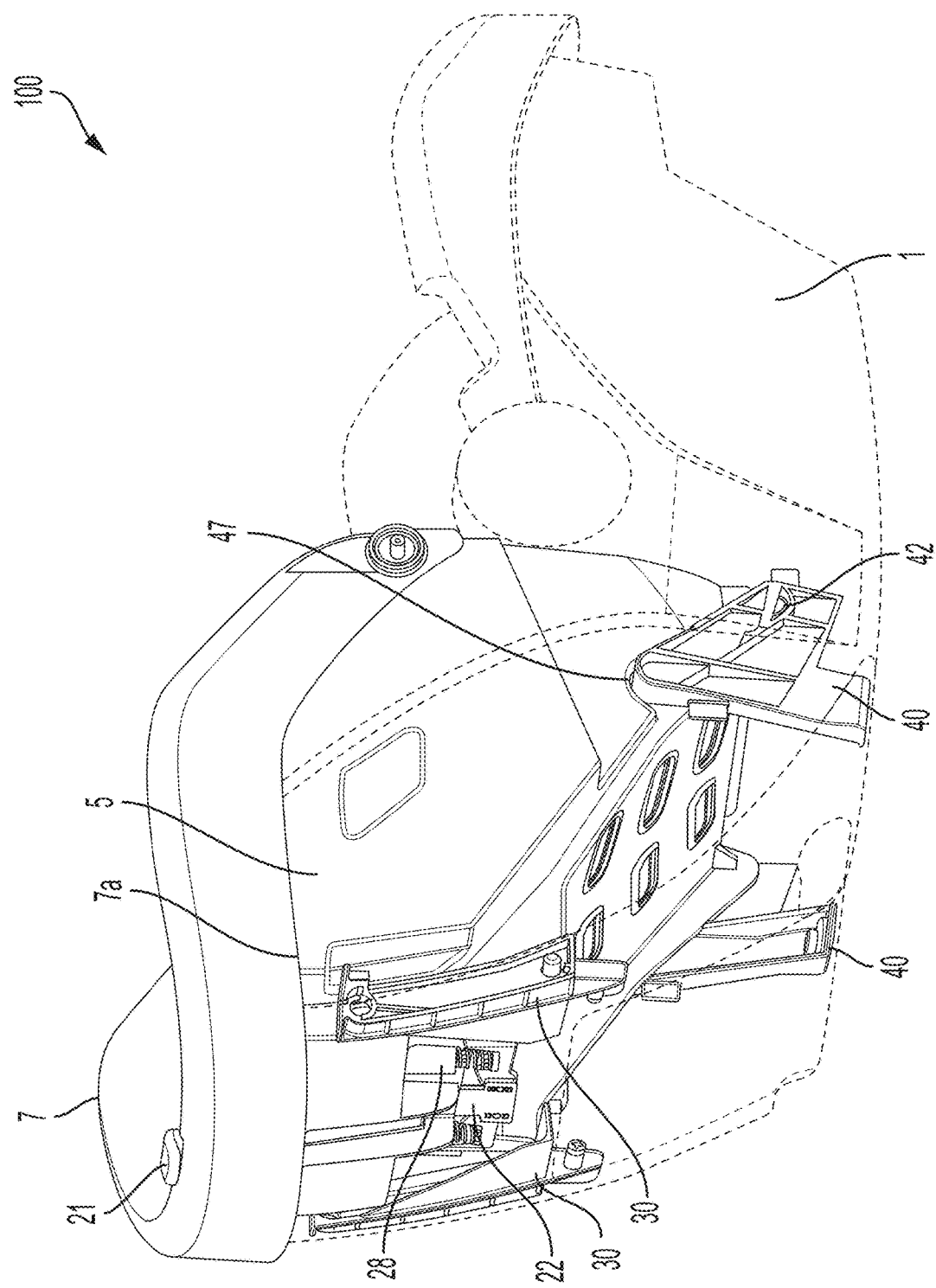
FIG. 2 is a perspective view of the child seat of FIG. 1 with the outer shell in wire frame to illustrate an adjustment mechanism mounted between the inner shell and the outer shell.

For clarity, the outer shell 1 and fixed liner 3 have been shown as wire frame only in FIG. 2 to illustrate a location and mounting of the adjustment mechanism 20 in relation to the inner shell 5. The seat 100 is shown in FIG. 2 in a compact configuration, with the movable inner shell 5 almost entirely nested within the outer shell 1. A peripheral collar 7 to the inner shell 5 is the only portion of the inner shell 5 not within the outer shell 1. The collar 7 can be a separate component or can be integrally formed with the inner shell 5. The collar 7 partially conforms to an upper edge of the inner shell 5 forming an overhang 7a that seats the collar 7 upon the outer shell 1.

The adjustment mechanism 20 (shown in isolation in FIGS. 4A, 4B, and 5A) connects the inner shell 5 to the outer shell 1 in four locations. Two active upper mounts 30 are provided on the left and right hand sides of the inner shell 5 and two lower mounts 40 are provided on the left and right hand sides of the inner shell 5. It is envisaged that only a single active upper mount 30 could be used to define a trajectory for the inner shell; however, utilizing a pair of active upper mounts 30 provides a more even weight distribution for the seat 100.

The two active upper mounts 30 define the trajectory of movement between the inner shell 5 and the outer shell 1, and support a portion of the weight of the inner shell 5. Additionally, the two active upper mounts 30 provide a locking mechanism for securing the inner shell 5 to the outer shell 1 in a plurality of predetermined locations. The two lower mounts 40 support the trajectory of the active upper mounts 30: in some embodiments mirroring the trajectory of the active upper mounts 30 and in some embodiments defining a second trajectory of movement for the lower portion of the inner shell 5 thereby providing a more complex adjustment between the inner shell 5 and the outer shell 1. The second trajectory allows for adjustment of the inner shell 5 to vary a back angle of the seat 100 such that a child can adopt a more upright position. The second trajectory further facilitates an extension of an overall height of the seat 100 without extending an overall length of the seat 100. Accordingly, the inner shell 5 can be moved to increase the child protection region 19 where there is minimal available spaced between the seat 100 and a vehicle front seat, when installed in a vehicle. The two lower mounts 40 support a majority of the weight of the inner shell 5 and the working loads applied thereto when a child is supported in the seat 100.

In the compact configuration of FIG. 2, the inner shell 5 is supported by the active mounts 30 towards an upper end of the inner shell 5, and supported by the lower mounts 40 toward a lower end of the inner shell 5. A shoulder 47 is formed within an outer surface of the inner shell 5 to conform to a shape and external dimensions of an upper portion of the lower mount 40, thereby providing clearance between the inner shell 5 and the lower mounts 40 when the seat 100 is in the compact configuration.

Figure 3A:
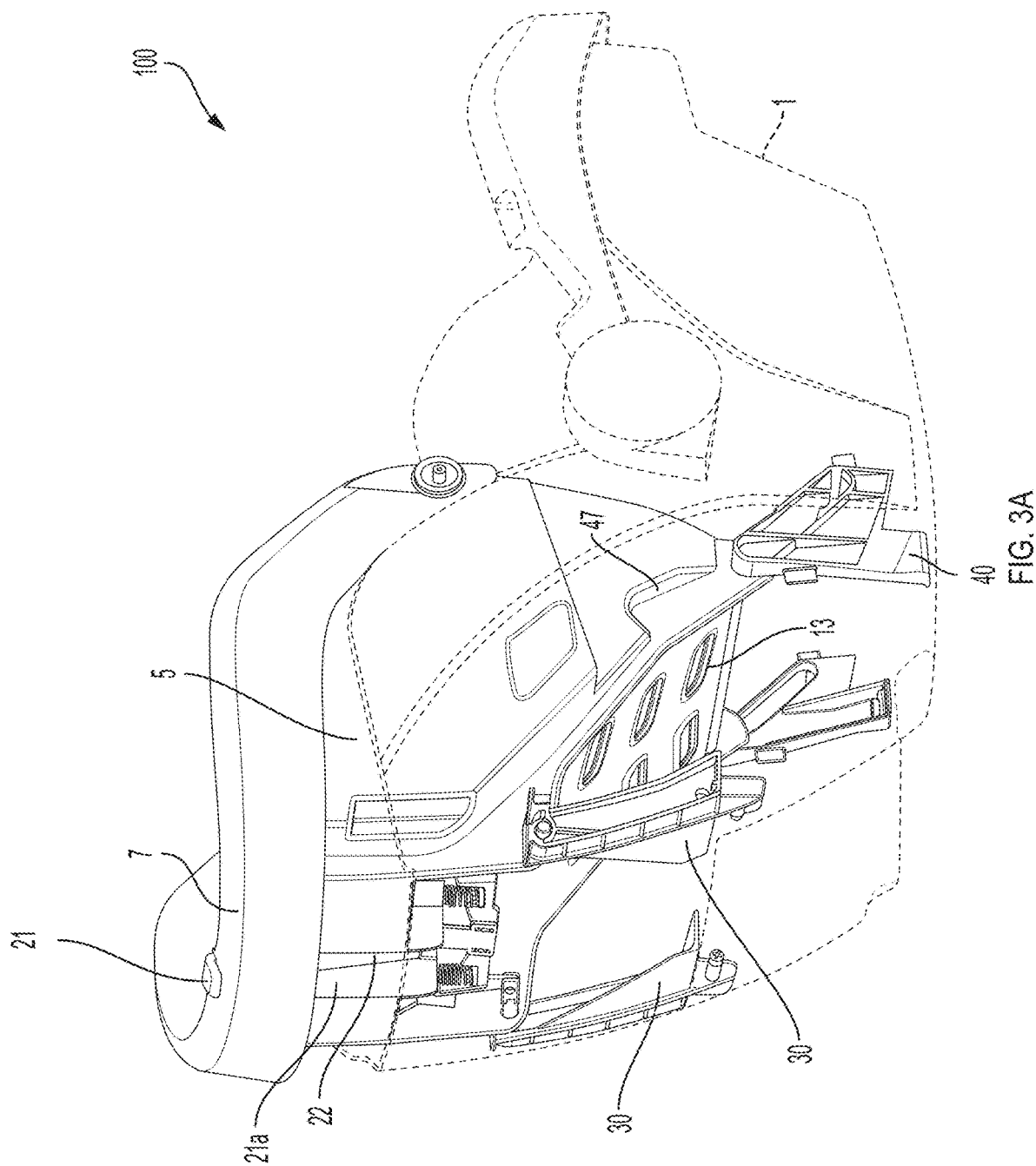
FIG. 3A is a perspective view of the child seat of FIG. 2 illustrating an extended configuration of the child seat having the inner shell raised above the outer shell.

FIG. 3A illustrates the inner shell 5 in an extended configuration, partially lifted and supported above the outer shell 1. This extended configuration provides the maximum dimensions to the child protection region 19 within the seat 100, with the inner shell 5 extended to the furthest extent of allowable travel by the active upper mounts 30. The restraint apertures 13 are formed within the inner shell 5 and thus move with the inner shell 5 to maintain a working spatial relationship with the child as the inner shell 5 is adjusted within the outer shell 1.

A release lever 22 and release handle 21 are internally disposed along a spine of the outer shell 1 and interposed between the inner shell 5 and the outer shell 1 such that the release handle 21 is accessible from the peripheral collar 7. The inner shell 5 can provide a cavity 21a in which the release handle 21 and release lever 22 nest. As the handle 21 is pulled away from the peripheral collar 7 to activate the mechanism 20, the lever 22 is guided along the cavity 21a formed between the inner shell 5 and the outer shell 1. In the extended configuration (FIG. 3) the release handle 21 sits proud of the collar 7 for ease of access, and below the collar 7 the lever 22 remains nested within the cavity 21a to protect the lever 22 from inadvertent activation of the mechanism 20.

The two lower mounts 40 are rigidly affixed to the outer shell 1 and are not free to move relative thereto. The lower mounts 40 in some embodiments can be bolted, screwed or otherwise adhered to an inner surface of the outer shell 1. Alternatively, the lower mounts 40 can be integrally formed with the outer shell 1. For example, the lower mounts 40 can be molded or formed into the molding of the outer shell 1. Likewise, the active upper mounts 30 can also be integrally formed, or molded into the molding of the outer shell 1. Alternatively, the active upper mounts 30 can be formed as discrete mounts or brackets that are assembled and rigidly affixed to the inner surface of the outer shell 1. Integrally forming the mounts 30, 40 can reduce costs on tooling and assembly of the inner shell 5.

In the extended configuration of FIG. 3A, the inner shell 5 is supported by the active mounts 30 towards an upper end of the inner shell 5, and supported by the lower mounts 40 toward a lower end of the inner shell 5. Any contact between the lower mounts 40 and the support shoulder 47 has been severed in this extended configuration.

Figure 3B:
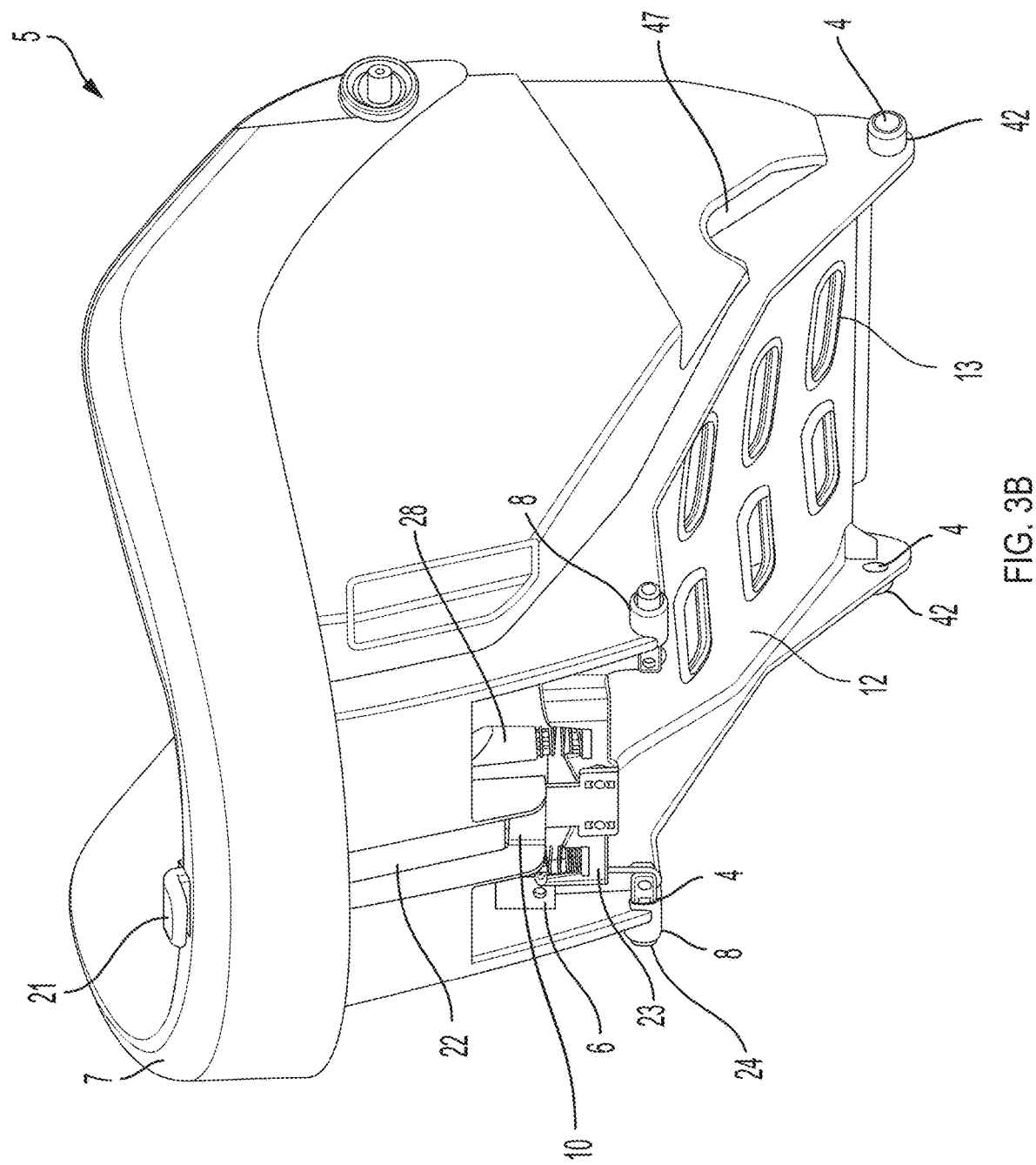
FIG. 3B is a perspective view of the inner shell of FIG. 3A with the outer shell removed to illustrate the mounting projections of the inner shell.

FIG. 3B is a perspective view of the inner shell 5 and adjustment mechanism 20 in isolation, illustrating upper mounting projections 8 and lower mounting projections 42 of the inner shell 5. The upper mounting projections 8 configured for engaging with the upper mounts 30 of the outer shell 1. The lower mounting projections 42 are configured for engaging with the lower mounts 40 of the outer shell 1. Illustrated in FIG. 3B the mounting projections 8, 42 are illustrated to be cylindrical having an elongate central recess 4 for co-operatively engaging with the respective upper mounts 30 and lower mounts 40. However, in some embodiments the mounting projections 8, 42 may be otherwise configured to co-operatively engage with the upper mounts 30 and lower mounts 40. For example the lower mounting projections 42 may be sold cylinders or dowels, or may include simple tabs or projections. Each of the mounting projections 8, 42 extends outwardly from the inner shell 5 towards the outer shell 1. The mounting projections 8, 42 can be integrally molded with the inner shell 5. The mounting projections 8, 42 can be engaged with the inner shell 5 as part of an assembly process, providing for ease of replacement. The mounting projections 8, 42 can be metal or composite inserts over-molded by the inner shell 5. Also molded into the inner shell 5 are a pair of spring retaining bosses 28, illustrated in FIG. 3B, providing a return mechanism for the adjustment mechanism 20.

Figure 4A:
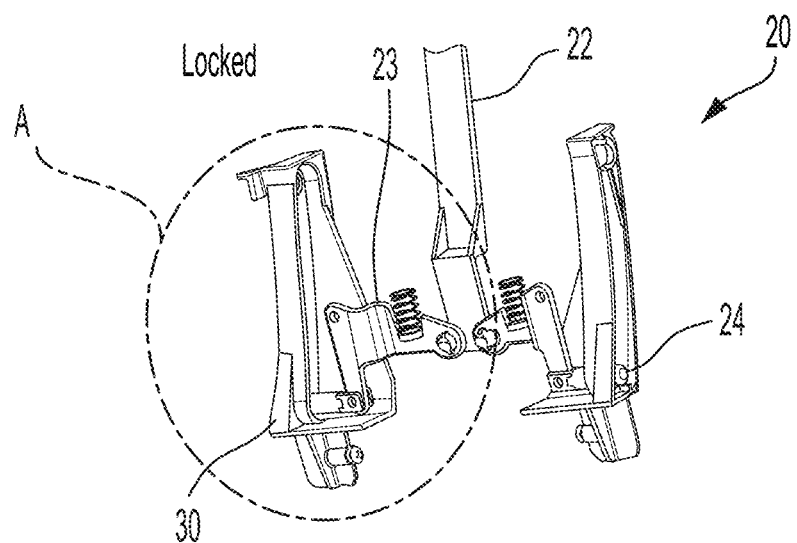
FIG. 4A is a view of the adjustment mechanism of FIG. 2, illustrating an extension track in Circle-A.
Figure 4B:
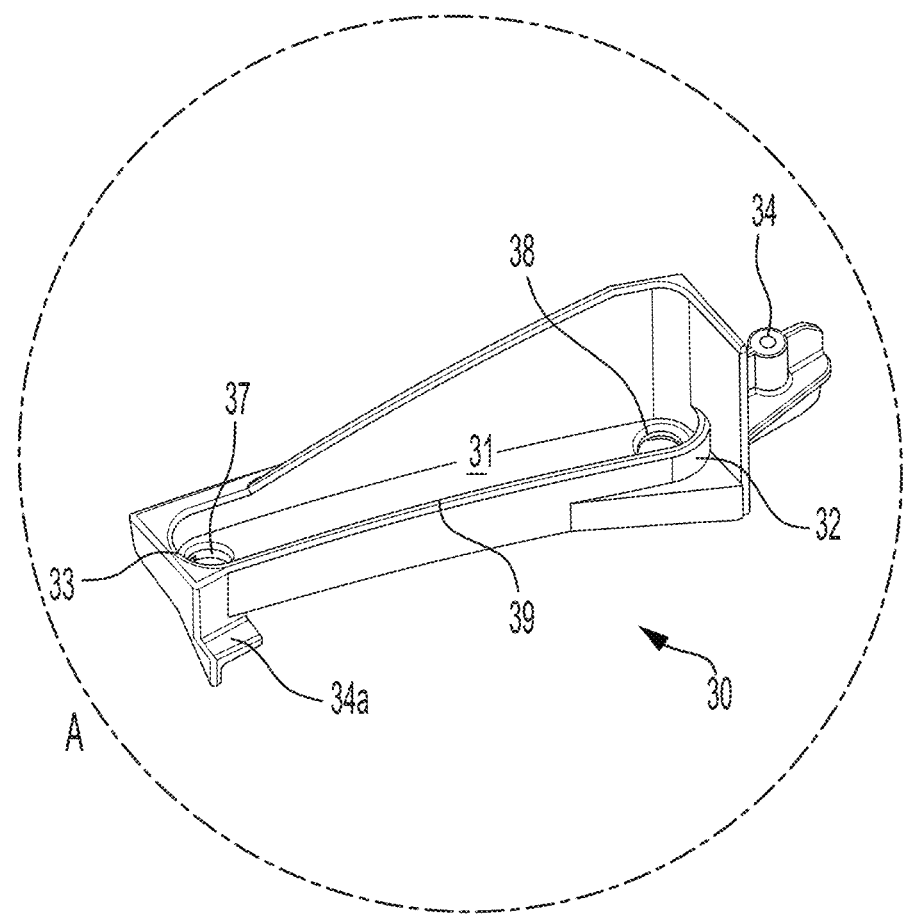
FIG. 4B is an enlarged view of the extension track from Circle-A of FIG. 6A.

Turning now to FIGS. 4A and 4B, where FIG. 4A illustrates the adjustment mechanism 20 in isolation from the outer shell 1 and the inner shell 5, and FIG. 4B illustrates an enlarged view of one of the pair of active upper mounts 30 as highlighted in Circle A of FIG. 4A. As seen in FIG. 4A, the mechanism 20 includes the release lever 22 supporting a pair of rotatable armatures 23, and a pair of retractable latching pins 24 configured to engage with and lock into the active upper mounts 30. The mechanism 20 will be described in more detail in reference to FIG. 5.

As seen in FIG. 4B, the active mount 30 includes an extension track 31 fully bounded by a peripheral wall 39. The extension track 31 defines the arc or trajectory of movement allowable between the outer shell 1 and the inner shell 5 by constraining movement of the corresponding upper mounting projection 8 of the inner shell 5 therein. The latching pins 24 (FIG. 4A) are configured to extend through the elongate central recesses 4 of each upper mounting projection 8 (FIG. 3B), to lock into a plurality of locking apertures 37, 38 of the track 30 and thereby hold the inner shell 5 in relation to the outer shell 1. The latching pins 24 travel along the extension track 31 trapped within the upper mounting projections 8 as they are guided along the extension track 31, within the peripheral wall 39. At each opposing end of the extension track 31, the peripheral wall 39 forms a lower or first stop 32 and an upper or second stop 33, restricting the upper mounting projections 8 from further movement relative thereto. When the active mount 30 is in position attached to the outer shell 1, the first and second stops 32, 33 define the limits of the upper mounting projections 8 and thus the pins' 24 movement. A mounting boss 34 is provided on the active upper mount 30, clear of the extension track 31, for rigidly affixing the active upper mount 30 to the outer shell 1.

Immediately adjacent the upper stop 33 is an upper or first locking aperture 37. When the inner shell 5 is extended to the furthest extension possible from the outer shell 1, the latching pin 24 is received and retained by this first locking aperture 37. Once the pin 24 is retained by the first locking aperture 37, the inner shell 5 can no longer move relative to the outer shell 1. The adjustment mechanism 20 provides for retraction of the locking pins 24 to simultaneously withdraw each pin 24 from a respective first locking aperture 37, allowing the pins 24 (and mounting projections 8 of the inner shell 5) to freely travel along the extension track 31 until abutment with the lower stop 32.

Immediately adjacent the lower stop 32 is a lower or second locking aperture 38. When the inner shell 5 is in the compact configuration i.e., fully nested within the outer shell 1, the latching pin 24 protrudes through the upper mounting projection 8, and is received and retained within the second locking aperture 38 preventing relative movement between the inner shell 5 and the outer shell 1. The locking pins 24 are biased towards the locked configuration such that the pins 24 will be urged towards the locked configuration when aligned with either of the first or second locking apertures 37, 38. It is further contemplated that additional locking apertures can be provided at predetermined intervals along the extension track 31 to define a plurality of lockable configurations between the inner shell 5 and the outer shell 1.

The first and second locking apertures 37, 38 are aligned between each of the active mounts 30 (left and right hand side of the outer shell 1) to support and lock the inner shell 5 in an even and level position relative to the outer shell 1. Towards an upper end of the active mount 30, an opposing end to the mounting boss 34, the upper mount 30 provides a locating member 34*a* configured to position and align the active upper mount 30 relative to the outer shell 1 during assembly of the seat 100. Each of the active upper mounts 30 are mirror images of one another and can be formed from a metal casting, a plastic molding or other moldable composite materials.

Figure 5A:
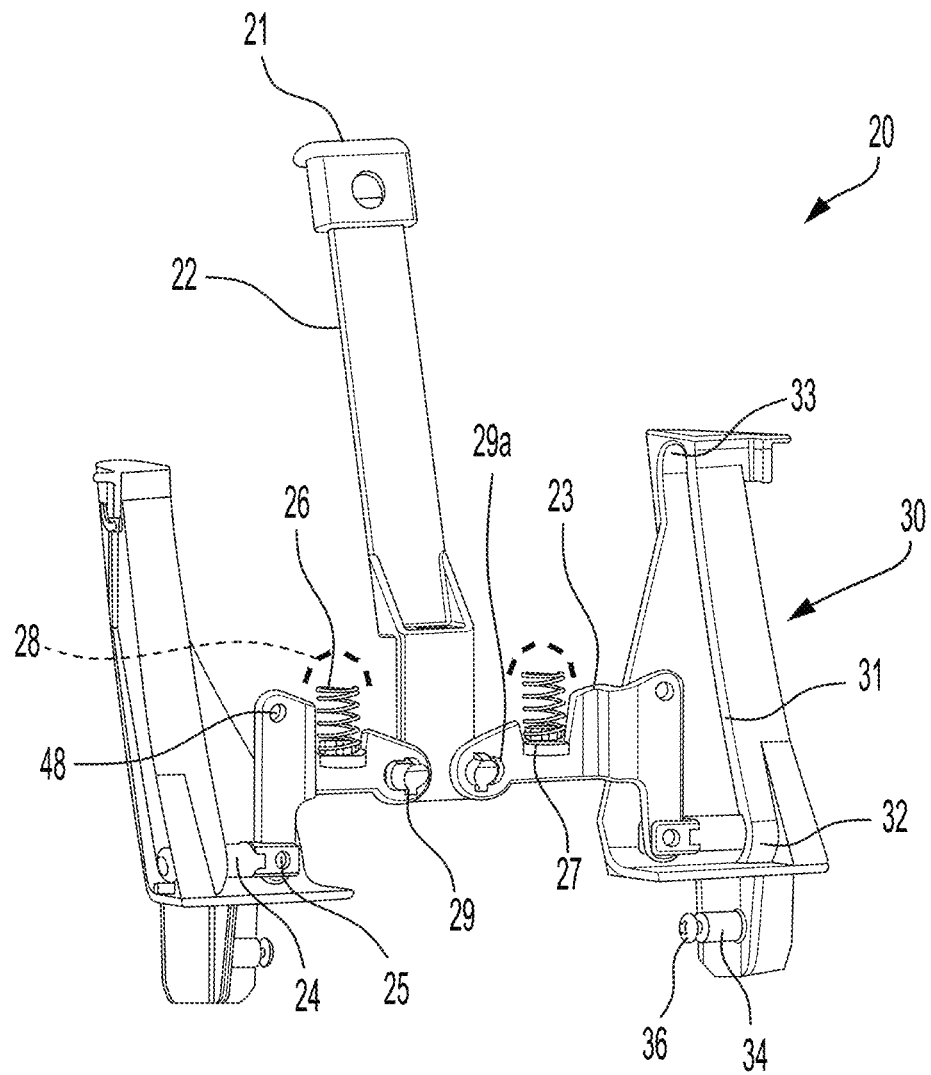
FIG. 5A is a perspective view of the adjustment mechanism of FIG. 2 in isolation from the child seat, in a locked configuration.

The adjustment mechanism 20 is illustrated in isolation from the outer shell 1 and inner shell 5 of the seat 100 in FIG. 5A. The latching pins 24 in FIG. 5A are illustrated in a locked configuration with each pin 24 received in the second locking aperture 38 of the respective active upper mounts 30. In the locked configuration, the pins 24 (surrounded by the upper mounting projections 8—not shown) are retained within the peripheral walls 39 of the active upper mounts 30 and extended through the second locking apertures 38 such that the weight of the inner shell 5 is at least partially supported by the mounting projections 8.

The adjustment mechanism 20 includes a double-sided latch arrangement, whereby the pair of latching pins 24 is configured to retract from the second locking apertures 38 towards one another in a lateral direction. The lateral direction of retraction is substantially perpendicular to a first direction in which the release handle 21 operates. As the release handle 21 is pulled in the first upward direction, away from the outer shell 1, the latching pins 24 are pulled inwardly retracting each pin 24 from the corresponding second locking aperture 38. The release handle 21 is ergonomically shaped for ease of use and can further be configured to nest flush within the collar 7 of the inner shell 5 when in an inoperative configuration. As the release handle 21 is pulled away from the outer shell 1 into an operative configuration, the adjustment mechanism 20 retracts the pins 24 allowing the upper mounting projections 8 to glide along the extension tracks 31 of the active upper mounts 30.

The release handle 21 is engaged with a release lever 22, the lever 22 being elongate and planar to facilitate packaging between the inner shell 5 and the outer shell 1. In some embodiments the handle 21 and lever 22 are integrally formed as a single component. The lever 22 can be manufactured from a hard plastic material. In some embodiments the lever 22 can be manufactured from a cable, metal, a strap or belt, or similar flexible material. The lever 22 is configured to transition between the inoperative configuration and the operative configuration under tension loads.

The release lever 22 extends from the collar 7 of the inner shell 5 down the spine of the seat 100 providing a pair of spindles 29 in proximity to the active upper mounts 30 of the outer shell 1. Each spindle 29 rotatably mounts one of the pair of armatures 23, each armature 23 supporting one of the respective latching pin 24 thereon.

The armatures 23 are approximately L-shaped, each armature providing three mounting points: (i) a mounting aperture 29a for rotatably mounting to the spindle 29; (ii) a pin axis 25 for pivotally mounting the latching pin 24; and (iii) an inner shell mounting aperture 48 for rotatably mounting the armature 23 to a mounting boss 6 of the inner shell 5 (see FIGS. 3B and 5B). As the handle 21 and lever 22 are pulled in the first direction away from the outer shell, 1 the spindles 29 are translated in the first direction rotating the armatures 23 about the inner shell mounting aperture 48 thereby drawing the latching pins 24 out of the respective first or second locking apertures 37, 38 of the extension tracks 31 (shown in FIG. 5B).

Between the mounting aperture 29a and inner shell mounting aperture 48 each armature 23 includes a spring seat 27 for mounting a proximal end of a return spring 26 thereto. A distal end of each return spring 26 is engaged with the spring retaining boss 28 of the inner shell 5, such that as the handle 21 is lifted, the lever 22 is translated in the first direction and each armature 23 rotates about the inner shell mounting aperture 48 toward the other, each return spring 26 being compressed between the spring seat 27 and the respective retaining boss 28 (see FIG. 5B for a compressed illustration of return springs 26). The return springs 26 are thus tensioned or biased as the latching pins 24 are drawn out of the locking apertures 38 ready to spring back towards the locked configuration when the handle 21 of lever 22 is released.

The lever 21, adjustment mechanism 20 and retaining bosses 28 are all affixed to the inner shell 5 and thus move relative to the outer shell 1 as the inner shell 5 is drawn into the extended configuration. The inner shell 5 provides a lever stop 10, illustrated in FIG. 5B, to limit the available travel of the lever 22 when the handle 21 is pulled. The lever stop 10 can be fitted to the inner shell 5 as an assembly process, or can be molded with the inner shell 5 to reduce part count.

In the unlocked configuration, each pin 24 is retracted clear of the respective second locking aperture 38 but remains confined with the upper mounting projection 8 and thereby within the confines of the peripheral wall 39, allowing the pin 24 (and the attached inner shell 5) to be guided along the extension track 31. When the lever 22 is released, the return springs 26 urge each latching pin 24 against the respective extension track 31 of the upper mounts 30. As the latching pins 24 are brought into alignment with the first locking apertures 37, the spring force from the return springs 26 urges the latching pins 24 into the first locking apertures 37 to receive and retain the latching pins 24 therein. The inner shell 5 is then locked in spaced relationship with the outer shell 1 in the extended configuration. The lever 22 can again be used to disengage the latching pins 24 from the first locking apertures 37 to again allow free movement of each mounting projection 8 along the corresponding extension track 31. Pulling the lever 22 will again prime the return springs 26 to tension the pins 24 ready to snap back into position within the second locking apertures 38, once aligned therewith.

When the latching pins 24 are not retained within the first or second locking apertures 37, 38, the upper stops 33 and lower stops 32 of the active upper mounts 30 ensure that the mounting projections 8 cannot be moved out of the extension track 31 or disengaged therefrom. This ensures that the inner shell 5 cannot be overextended relative to the outer shell 1 and the two parts remain engaged.

Each latching pin 24 is pivotally mounted to the respective armature 23 about the pin axis 25. The joint can be formed between the pin 24 and the armature 23 in a number of ways, with the pin 24 snap fitting to the armature 23 or vice versa. Alternatively, a locking pin can be used to pivotally engage the pin 24 with the armature 23. The pin axes 25 are parallel with the rotational axes of the spindles 29 and the rotational axes of the inner shell mounting apertures 48 such that the armatures 23 rotate in a plane substantially parallel to the first direction in which the lever 22 is translated. The pivotal attachment of each pin 24 allows each pin 24 to be withdrawn approximately perpendicularly to the direction of movement of the lever 22. Each pin axis 25 is disposed at right angles to the direction of movement of the lever 22.

Figure 6A:
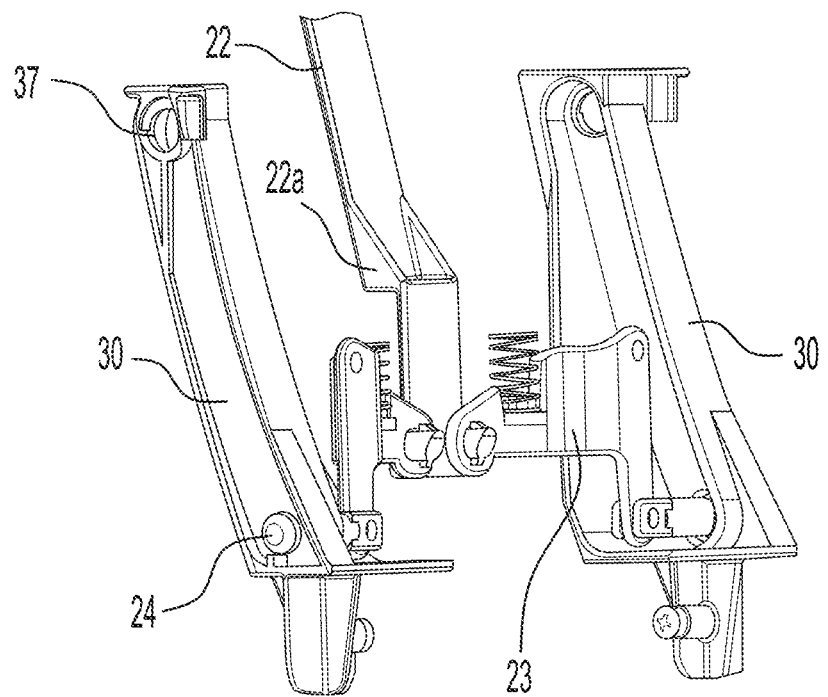
FIG. 6A is a side perspective view of the adjustment mechanism of FIG. 4, in a locked configuration.
Figure 6B:
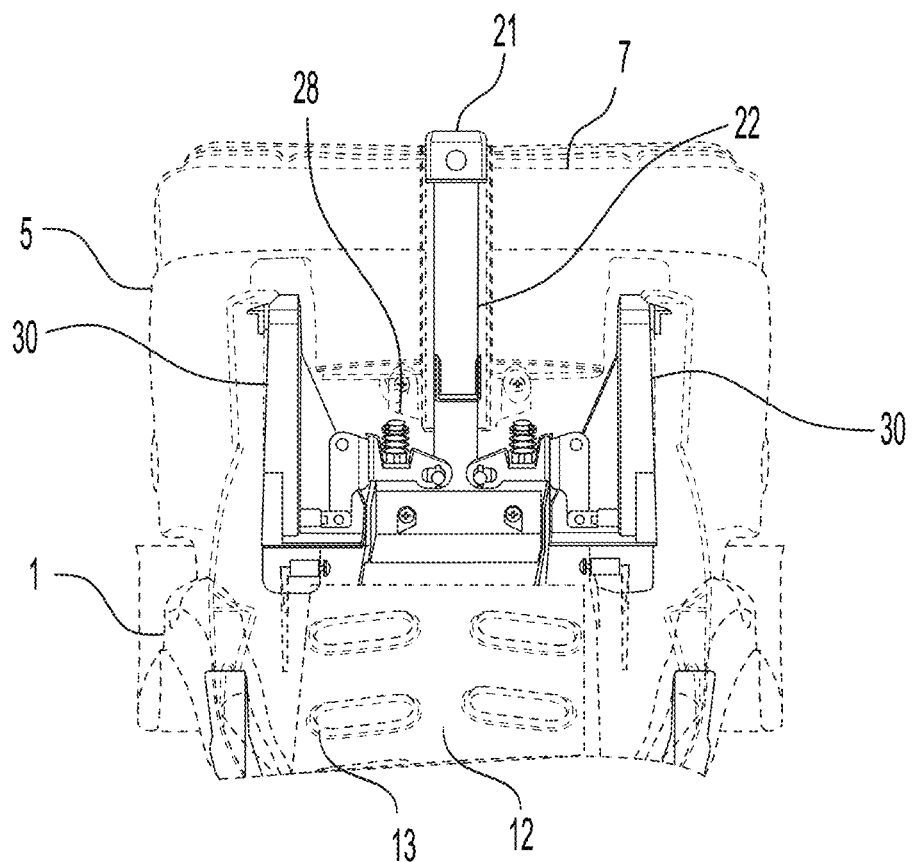
FIG. 6B is a front view of the adjustment mechanism of FIG. 6A, illustrating the inner and outer shell of the child sear in wire frame for spatial context.

FIGS. 6A and 6B illustrate a side view of the adjustment mechanism 20 and a front view of the adjustment mechanism 20 with the outer shell 1 and inner shell 5 superimposed in wire frame, for context. FIG. 6A illustrates a step 22a in the release lever 22 aligned with the spine of the seat 100, and configured for packaging between the inner shell 5 and outer shell 1. The step 22a is dimensioned to cooperate with the lever stop 10, providing an abutment surface against which the lever 22 is retained, to thereby limit travel when the handle 21 is pulled away from the outer shell 1. The adjustment mechanism 20 is illustrated in FIG. 6A in the locked configuration with the latching pins 24 extending through the lower locking apertures 38 of each upper mount 30.

The wireframe of the inner shell 5 as shown in FIG. 6B illustrates the pair of spring retaining bosses 28 against which the retaining springs 26 are compressed when the latching pins 24 are released from the first and second locking apertures 37, 38.

Figure 7A:
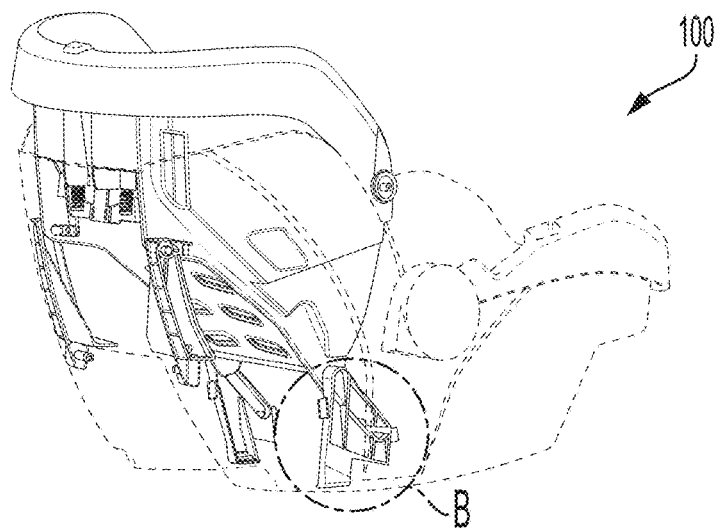
FIG. 7A is a reproduction of FIG. 3A illustrating a left-hand side mount of the adjustment mechanism in Circle-B.

The lower portion of the inner shell 5 is supported by the pair of lower mounts 40 (illustrated in FIG. 7A). A first lower mount 40 is encircled in Circle B supporting the inner shell 5 in the extended configuration. A second lower mount 40 supports an opposing side of the inner shell 5, each of the first and second lower mounts 40 are illustrated in enlarged perspective views in FIGS. 7B and 7C.

Each lower mount 40 includes a guide track 41 bounded by a peripheral wall 46. Each guide track 41 is directed inwardly towards the inner shell 5 to receive and restrain the lower mounting projections 42 rigidly affixed to the inner shell 5. The projections 42 can be molded components, integrally formed with the inner shell 5. In some embodiments, the lower mounting projections 42 can be a dowel or bolt that can be manufactured separately from the inner shell 5 and mounted thereto in a separate assembly operation. Forming the lower mounting projections 42 as separate components may facilitate manufacture and assembly of the seat 100.

The lower mount 40 additionally includes a mounting foot 43 for locating and fixing the lower mount 40 to an inner surface of the outer shell 1. Locating members 49 are disposed at opposing sides of the lower mount 40 to located and space the lower mount 40 within the outer shell 1 for assembly. Each lower mount 40 can be molded from a plastic material or cast from a metal or composite material. An outer face 40a of each lower mount 40 (illustrated in FIG. 7B) includes a series of support webs 50 strengthening the guide track 41 and facilitating material reduction (and weight reduction) of the lower mounts 40.

Figure 7B:
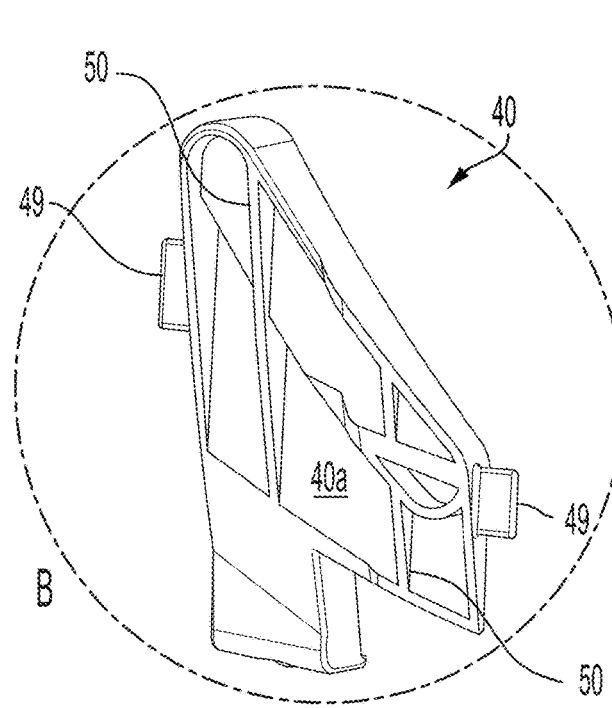
FIG. 7B is an enlarged view of the mount from Circle-B of FIG. 7A illustrating a series of support webs.
Figure 7C:
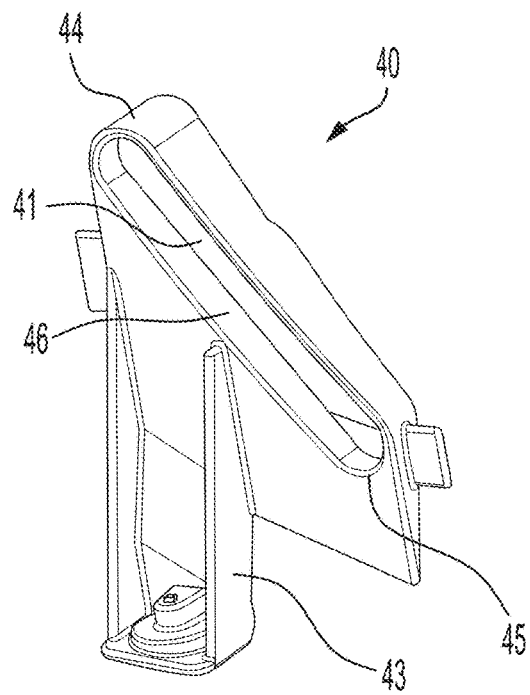
FIG. 7C is a perspective view of an opposing right-hand side mount illustrating a guideway and a mounting boss.

As seen in FIG. 3B, the lower mounting projections 42 are cylindrical in shape and confined to travel along the guide track 41 by the peripheral wall 46 (see FIG. 7B). The lower mounting projections 42 can have a central recess or can be solid in some embodiments. The peripheral wall 46 forms an upper or first stop 44 and a lower or second stop 45 at opposing ends of the guide track 41. The first and second stops 44, 45 prevent the lower mounting projection 42 from being disengaged from the guide track 41. When the seat 100 is in the compact configuration, the shoulder 47 of the inner shell 5 seats upon the lower mount 40 (see FIG. 2). As the inner shell 5 is released to slide relative to the outer shell 1, the shoulder 47 forms a tertiary guideway for the trajectory of movement between the inner shell 5 and outer shell 1. With the seat 100 in the extended configuration, the projection 42 is the only connection between the lower portion of the inner shell 5 and the lower mounts 40.

The guide tracks 41 can be configured to mirror the shape and length of the extension tracks 31 of the upper mounts 30 to support the inner shell 5 through the trajectory of movement relative to the outer shell 1. Alternatively, the guide tracks 41 can be configured to have a different shape and/or length to that of the extension tracks 31 of the active upper mounts 30 to thereby define a more complex trajectory of movement between the inner shell 5 and the outer shell 1. It is contemplated that locking means can be provided to lock the lower mounting projections 42 to the guide tracks 41 by means of a button or activator. As such, a series of locking apertures can be provided along the guide tracks 41 to define predetermined locking points along the guide tracks 41.

In some embodiments, it is envisaged that the lever 22 can be extended towards the lower mounts 40 and a similar adjustment mechanism to that of mechanism 20 can be configured to mount to the lever 22, such that pulling the handle 21 will release an upper pair of latching pins 24 and a lower pair of latching pins, allowing the upper mounting projections 8 to slide along extension tracks 31 and the lower mounting projections 42 to slide along guide tracks 41 simultaneously.

FIG. 8 illustrates the child seat 100 releasably mounted to the base unit 102, for securing the child seat 100 to fixed anchors points or a seat of a vehicle. The seat 100 is illustrated in the compact configuration with the inner shell 5 fully encased within the outer shell 1 and the release handle 21 accessible, sitting proud of the inner shell collar 7. When mounted to the base unit 102, the carry handle 9 and adjustment mechanism 20 are free to adjust the seat 100 between the compact and extended configurations, thus facilitating adjustment of the child protection region 19 by a user without disengaging the seat 100 from the vehicle.

Although not illustrated in FIGS. 1-8, the inner shell 5 of the seat 100 may further include a lining, and each of the inner shell 5 and fixed liner 3 may be supplemented with a plurality of cushions to support the child in the seat 100 and to provide comfort. The cushions can be shaped and located to provide support and to assist in properly locating the child within the child protection region 19. The lining can be removable to facilitate laundering and replacement of the lining in the event of spills and accidents. The plurality of cushions can also be removably mounted to the inner shell 5 and/or fixed liner 3 by way of fasteners. The fasteners retain the cushions in fixed locations about the inner shell 5 and fixed liner 3, to prevent them from being inadvertently displaced or incorrectly positioned within the child protection region 19. The fasteners can be selected from (but not limited to) pop-studs, buttons, zips, Velcro, magnets, and ties, to allow the cushions to be removed and replaced. The cushions can be provided in a variety of sizes allowing for further variation to the shape and size of the child protection region 19, for example, the cushions can be made from a foam or similar energy absorbing material and configured as inserts to mount around the inner shell 5 and fixed liner 3 to further define the shape and size of the child protection region 19. These cushion can be modular in nature, allowing a user to select from combinations of the cushions to provide a gradual and measured increase in the size and shape or the child protection region 19 as the infant grows and matures.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow. Accordingly, the scope of the invention should be determined not by the embodiments illustrated, but by the appended claims and their equivalents.

What is claimed is:

1. A child seat adjustment mechanism comprising:
   a latch having a pair of opposing latching pins mounted to an inner shell of a child seat via a release lever, each latching pin constrained to travel within a respective extension track of a pair of opposing extension tracks of an outer shell of the child seat in a first unlocked configuration;
   wherein each of the pair of extension tracks comprises a peripheral wall defining a trajectory of movement between the inner shell and the outer shell and a plurality of corresponding locking apertures for receiving and retaining the latching pins in a second locked configuration.

2. The child seat adjustment mechanism of claim 1, wherein the adjustment mechanism is disposed between the inner shell and the outer shell of the child seat, and wherein the outer shell supports the inner shell therein, such that the inner shell and the outer shell together define a child protection region.

3. The child seat adjustment mechanism of claim 2, wherein movement of the inner shell relative to the outer shell along the trajectory of movement adjusts a size and a shape of the child protection region of the seat to transition the seat between a compact configuration and an extended configuration.

4. The child seat adjustment mechanism of claim 3, wherein the size and the shape of the child protection region in the compact configuration is arranged to support a child in a supine orientation.

5. The child seat adjustment mechanism of claim 3, wherein the size and the shape of the child protection region in the extended configuration is arranged to support a child in an upright seating orientation.

6. The child seat adjustment mechanism of claim 3, wherein the inner shell comprises a posture support surface for supporting a spine of a child, wherein the movement of the inner shell from the compact configuration toward the extended configuration adjusts a distance and an angular orientation of the posture support surface relative to the outer shell thereby shaping the child protection region to encourage the child to adopt an upright seating orientation.

7. The child seat adjustment mechanism of claim 3, wherein the inner shell comprises a posture support surface for supporting a spine of a child, wherein the movement of the inner shell from the extended configuration toward the compact configuration adjusts a distance and an angular orientation of the posture support surface relative to the outer shell thereby shaping the child protection region to encourage the child to adopt a supine orientation.

8. The child seat of claim 1, wherein the plurality of corresponding locking apertures are aligned between the pair of extension tracks.

9. The child seat adjustment mechanism of claim 1, wherein opposing ends of the peripheral walls of each extension track define a first stop and a second stop, the trajectory of movement of the latching pins confined therebetween.

10. The child seat adjustment mechanism of claim 1, wherein a first latching pin is movably mounted to the release lever via a first rotatable armature and a second latch pin is movably mounted to the release lever via a second rotatable armature, such that translation of the release lever in a first direction rotates the first and second rotatable armatures towards one another thereby retracting the first latch pin and the second latch pin from respective locking apertures of the opposing extension tracks to allow the inner shell to move freely along the extension tracks.

11. The child seat adjustment mechanism of claim 10, wherein the first direction of the release lever is directed away from the outer shell.

12. The child seat adjustment mechanism of claim 1, wherein each latching pin is partially shrouded by an upper mounting projection of the inner shell, the upper mounting projection confined to move within the respective extension track in the first unlocked configuration.

13. The child seat adjustment mechanism of claim 1, wherein a distal end of each latching pin protrudes from the respective upper mounting projection to thereby engage with a respective locking aperture of the extension track in a second locked configuration.

14. A method of adjusting a child protection region of a child safety seat formed between an outer shell and a moveable inner shell, comprising:
  unlocking a biased adjustment mechanism comprising a pair of latching pins releasing the seat from a compact configuration;
  sliding the inner shell along a pair of arcuate extension tracks to reposition the inner shell relative to the outer shell;
  aligning the latching pins with a pair of respective locking apertures of the arcuate extension tracks; and
  locking the inner shell against the outer shell in an extended configuration.

15. The method of claim 14, further comprising attaching inserts to the inner shell to further define a shape and size of the child protection region.

16. The method of claim 15, wherein the inserts are selected from a plurality of cushions having differing sizes and shapes thereby adjusting the shape and size of the child protection region.

17. A child seat comprising:
  an outer shell supporting an inner shell therein, the inner shell and the outer shell together defining a child protection region within the seat; and
  an adjustment mechanism configured to move the inner shell relative to the outer shell;
  wherein the inner shell comprises a posture support surface; and
  wherein movement of the inner shell relative to the outer shell adjusts a size and a shape of the child protection region of the seat to transition the seat between a compact configuration and an extended configuration by adjusting a distance and an angular orientation of the posture support surface relative to the outer shell thereby shaping the child protection region to encourage the child to adopt a supine orientation.

18. The child seat of claim 17, further comprising at least one insert attached to the inner shell, the at least one insert defining a shape of a child protection region.

19. The child seat of claim 18, wherein the at least one insert is selected from a plurality of cushions having differing sizes and shapes.

20. The child seat of claim 17, wherein the adjustment mechanism comprises a latch having a pair of opposing latching pins mounted to the inner shell via a release lever, each latching pin constrained to travel within a respective extension track of a pair of opposing extension tracks of the outer shell in a first unlocked configuration.

* * * * *